United States Patent
Snapir et al.

(10) Patent No.: US 11,283,748 B2
(45) Date of Patent: Mar. 22, 2022

(54) MESSAGE BASED INFORMATION TECHNOLOGY SERVICE MANAGEMENT

(71) Applicant: ENTIT Software LLC, Sunnyvale, CA (US)

(72) Inventors: Yariv Snapir, Yehud (IL); Emil Shmul, Yehud (IL); Shiran Gabay, Yehud (IL); Dan Noter, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 360 days.

(21) Appl. No.: 15/753,338

(22) PCT Filed: Aug. 31, 2015

(86) PCT No.: PCT/US2015/047782
§ 371 (c)(1),
(2) Date: Feb. 19, 2018

(87) PCT Pub. No.: WO2017/039621
PCT Pub. Date: Mar. 9, 2017

(65) Prior Publication Data
US 2018/0241711 A1    Aug. 23, 2018

(51) Int. Cl.
*H04L 12/14* (2006.01)
*H04L 51/42* (2022.01)
*G06Q 10/06* (2012.01)
*H04L 51/02* (2022.01)
*H04L 51/00* (2022.01)
*G06Q 10/10* (2012.01)
*G06Q 40/02* (2012.01)
*G06F 3/04842* (2022.01)

(52) U.S. Cl.
CPC .............. *H04L 51/22* (2013.01); *G06Q 10/06* (2013.01); *G06Q 10/107* (2013.01); *H04L 51/00* (2013.01); *H04L 51/02* (2013.01); *G06F 3/04842* (2013.01); *G06Q 40/02* (2013.01)

(58) Field of Classification Search
CPC ... H04L 29/08072; H04L 29/06; H04L 15/44; H04L 12/14; H04L 51/22; H04L 51/00; H04L 51/02; G06Q 10/06; G06Q 10/101; G06Q 3/04841; G06Q 40/02; G06Q 10/107
USPC .......................... 709/206, 220, 224, 226, 228
See application file for complete search history.

(56) References Cited

U.S. PATENT DOCUMENTS

| | | |
|---|---|---|
| 7,555,526 B1 | 6/2009 | Heidloff |
| 7,614,955 B2 * | 11/2009 | Farnham ................. A63F 13/12 463/42 |
| 7,827,228 B2 | 11/2010 | Emberton |

(Continued)

OTHER PUBLICATIONS

International Searching Authority, International Search Report and Written Opinion, dated May 25, 2016, 10 pgs.

(Continued)

*Primary Examiner* — Khanh Q Dinh (57) ABSTRACT

In one implementation, a system for message based information technology service management includes an editor engine to generate a first message that includes a description of a service request, an action engine to add a number of actions to the first message relating to the service request, and a response engine to send a second message to a number of users based on the service request and the number of actions added to the first message.

20 Claims, 4 Drawing Sheets

(56) References Cited

U.S. PATENT DOCUMENTS

| | | | |
|---|---|---|---|
| 8,468,090 B2* | 6/2013 | Lesandro | G06Q 20/12 705/39 |
| 8,468,233 B1* | 6/2013 | Oppitz | G06Q 10/06316 709/223 |
| 8,903,931 B1 | 12/2014 | Rothman et al. | |
| 8,924,532 B2* | 12/2014 | Oppitz | G06Q 10/06316 709/223 |
| 8,935,772 B2* | 1/2015 | Devine | G06F 11/0781 726/11 |
| 9,495,666 B2* | 11/2016 | Liu | G06Q 10/20 |
| 9,557,889 B2* | 1/2017 | Raleigh | H04M 15/44 |
| 9,716,634 B2* | 7/2017 | Sapuram | G06Q 30/0631 |
| 9,805,319 B2* | 10/2017 | Beno | G06Q 10/06 |
| 9,820,016 B2* | 11/2017 | Ljung | H04W 12/02 |
| 10,177,988 B2* | 1/2019 | Maes | G06F 16/22 |
| 10,397,309 B2* | 8/2019 | Wunderlich | H04L 67/10 |
| 10,552,796 B1* | 2/2020 | Delacourt | G06Q 10/06 |
| 10,572,842 B1* | 2/2020 | To | G06Q 10/063114 |
| 10,789,641 B2* | 9/2020 | Roselli | G06Q 40/02 |
| 2001/0013072 A1 | 8/2001 | Okada et al. | |
| 2009/0172689 A1 | 7/2009 | Bobak et al. | |
| 2009/0187651 A1 | 7/2009 | Schuckenbrock et al. | |
| 2009/0241159 A1* | 9/2009 | Campagna | H04N 21/4788 725/131 |
| 2011/0071865 A1* | 3/2011 | Leeds | G06Q 10/025 705/6 |
| 2011/0153629 A1* | 6/2011 | Lehmann | G06Q 30/06 707/758 |
| 2012/0054095 A1* | 3/2012 | Lesandro | G06Q 40/02 705/39 |
| 2012/0110330 A1* | 5/2012 | Dickgiesser | H04L 9/3271 713/168 |
| 2013/0041781 A1* | 2/2013 | Freydberg | G06Q 30/06 705/27.1 |
| 2013/0132854 A1* | 5/2013 | Raleigh | H04W 4/60 715/738 |
| 2013/0159881 A1* | 6/2013 | Liu | G06Q 10/20 715/753 |
| 2013/0210360 A1* | 8/2013 | Ljung | H04B 7/24 455/41.2 |
| 2013/0268839 A1 | 10/2013 | Lefebvre et al. | |
| 2014/0067702 A1* | 3/2014 | Rathod | G06Q 10/10 705/319 |
| 2014/0081698 A1* | 3/2014 | Oppitz | G06Q 10/06316 705/7.26 |
| 2014/0096109 A1* | 4/2014 | Beno | G06F 8/70 717/120 |
| 2014/0149283 A1* | 5/2014 | Roselli | G06Q 20/10 705/39 |
| 2016/0065417 A1* | 3/2016 | Sapuram | H04L 47/70 709/223 |
| 2016/0285790 A1* | 9/2016 | Szeto | H04L 51/02 |
| 2016/0285816 A1* | 9/2016 | Schmid | H04L 67/306 |
| 2016/0337215 A1* | 11/2016 | Wunderlich | H04L 67/10 |
| 2018/0060890 A1* | 3/2018 | Noter | G06Q 10/06393 |

OTHER PUBLICATIONS

BMC Remedy ITSM, AR System, verson 8.1.00; , "Trending in Support: Email-based Approvals", retrieved from https://communities.bmc.com/community/bmcdn/bmc_it_service_support/blog/; Dec. 17, 2013; 29 pp.

Unknown; "Clear and efficient Incident and Request Fulfillment Management—With the OTRS Agent Interface and the Customer Chat Feature", retrieved from https://www.otrs.com/otrs-business-solution-for-better-customer-service/otrs-as-it-service-software/; Retrieved Aug. 13. 2015; 12 pp.

Unknown; "Processmaker—Actions by Email Feature", retrieved from http://wiki.processmaker.com/3.0/ProcessMaker_-_Actions_by_email, Jun. 26, 2015, 11 pp.

Unknown; "Skip the Login: Supplier Transactions via Email"; retrieved from https://success.coupa.com/Optimizer/Product_Spotlight/Skip_the_Login%3A_Suppolier_Transactions_via_Email: Feb. 16, 2018; 3 pp.

* cited by examiner

MESSAGE BASED INFORMATION TECHNOLOGY SERVICE MANAGEMENT

BACKGROUND

Organizations can utilize information technology (IT) systems such as computing systems and/or networks. To maintain the IT systems, the organization can utilize an information technology service management (ITSM) system. The ITSM system can be accessed by a number of IT technicians and other members of the organization to report problems with the IT systems. The reported problems can be sent to the IT technicians or other members of the organization. The IT technicians can update the ITSM system when the reported problems are fixed or addressed.

DETAILED DESCRIPTION

A number of methods, systems, and computer readable media for message based information technology service management are described herein. A number of systems (e.g., information technology (IT) systems, human resource (HR) systems, troubleshooting systems, etc.) can be utilized across an organization. For example, a corporation can utilize a number of IT systems that can be commonly used at a variety of different locations. In this example, the IT systems can include computing systems, network systems, and/or other systems that can be maintained by the corporation. Many organizations can utilize information technology service management (ITSM) systems to manage and maintain a functionality of the number of systems. For example, an ITSM system can be utilized by members of the organization to report problems with the IT systems. When the IT system problems are reported to the ITSM system, IT technicians and/or other members of the organization can utilize the ITSM system to fix the IT system problems. Many examples described herein refer to an IT system; however the present disclosure is not limited to such systems.

In some examples, the ITSM system may request members of the organization to log into the ITSM system to perform a number of functions (e.g., add a service request, ask questions about the service request, add a status about the service request, notify the ITSM system that the service request has been completed, etc.). It may be difficult or time consuming for members of the organization to log into the ITSM system each time a member wants to update the status of a service request. As used herein, the service request can be a description of a device or system that is not functioning properly, a request for a particular service to be performed, and/or a request for a meeting to take place. For example, the service request can include a description that a video connector in a particular area is not functioning.

The systems and methods for message based information technology service management described herein can utilize a messaging system (e.g., email system, text messaging system, etc.) to enable members of the organization to manage and update the ITSM system service requests. For example, a first user can utilize the ITSM system to generate a service request. Upon the generation of the service request, a message from a messaging system can be generated and sent to a number of users (e.g., members of the organization) based on a type of service request generated. The message can include a description of the service request and/or a number of embedded action buttons that can be utilized by a recipient of the message to perform a number of actions (e.g., functions) within the ITSM system without having to log into the ITSM system. Many examples herein refer to email as the messaging service, however the systems, methods, and computer readable medium described herein can utilize a number of different messaging services.

Figure 1:
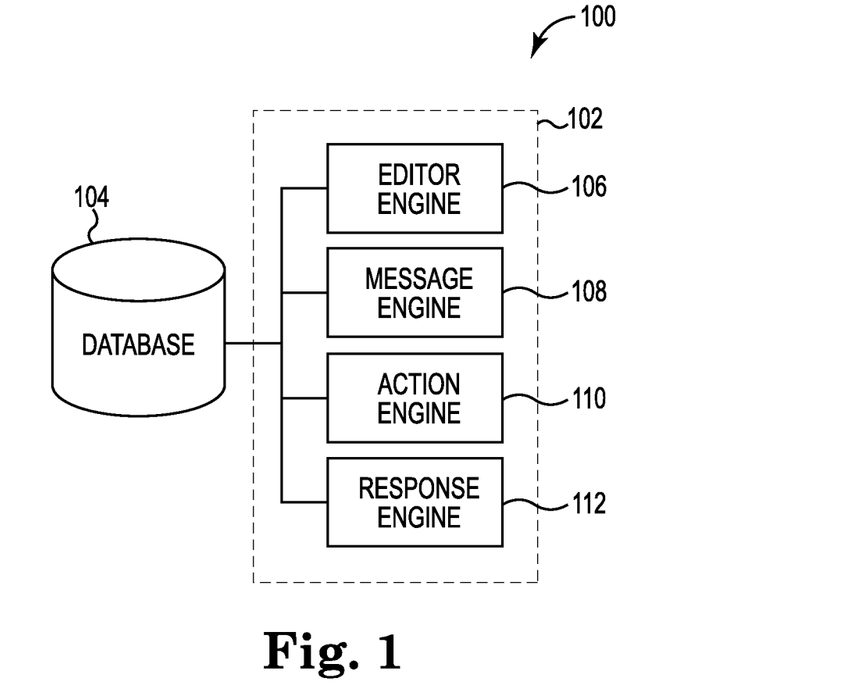
FIG. 1 illustrates a diagram of an example of a system for message based information technology service management consistent with the present disclosure.
Figure 2:
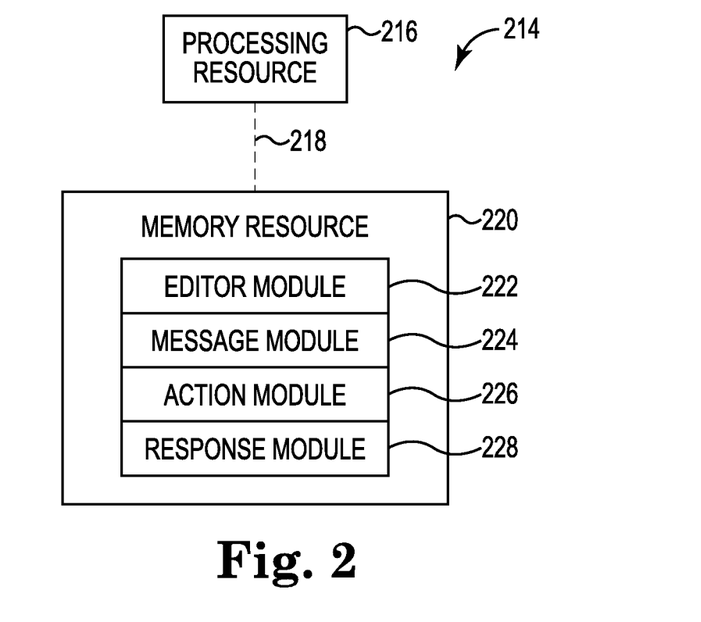
FIG. 2 illustrates a diagram of an example computing device for message based information technology service management consistent with the present disclosure.

FIGS. 1 and 2 illustrate examples of system 100 and computing device 214 consistent with the present disclosure. FIG. 1 illustrates a diagram of an example of a system 100 for message based information technology service management consistent with the present disclosure. The system 100 can include a database 104, a message based information technology service management system 102, and/or a number of engines (e.g., editor engine 106, message engine 108, action engine 110, response engine 112). The message based information technology service management system 102 can be in communication with the database 104 via a communication link, and can include the number of engines (e.g., editor engine 106, message engine 108, action engine 110, response engine 112). The message based information technology service management system 102 can include additional or fewer engines that are illustrated to perform the various functions as will be described in further detail in connection with FIGS. 3-5.

The number of engines (e.g., editor engine 106, message engine 108, action engine 110, response engine 112) can include a combination of hardware and programming, but at least hardware, to perform functions described herein (e.g., generate a first message that includes a description of a service request, send the first message to a number of users based on the service request, add a number of actions to the first message relating to the service request, send a second message to a number of users based on the service request and the number of actions added to the first message, etc.) stored in a memory resource (e.g., computer readable medium, machine readable medium, etc.) as well as hard-wired program (e.g., logic).

The editor engine 106 can include hardware and/or a combination of hardware and programming, but at least hardware, to generate a first message that includes a description of a service request. The service request can be generated with an ITSM system. In some examples, the editor engine 106 can generate the first message upon the generation of the service request within the ITSM system. The first message can be generated with a separate and distinct messaging system from the ITSM system. For example, the generated service request can initiate a messaging system such as Microsoft Outlook® to send the first message with a description of the service request.

The message engine 108 can include hardware and/or a combination of hardware and programming, but at least hardware, to send the first message to a number of users based on the service request. As described herein, the first message can be sent to a number of users based on a type of service described in the service request as well as a user profile of the number of users. For example, the service request can include a description of a malfunction that can be categorized as a type of service (e.g., service type, etc.). In this example, the service request can include a description that a network connection in a particular room is not working properly. This service request can be categorized as a network type of service request. Thus, in this example, the first message can be sent to a number of users that may have knowledge of how to fix a network type of service request and/or users that may be affected by the network connection not working properly.

In some examples, the user profile of the number of users can be utilized when sending the first message. For example, an IT manager can have a profile that indicates that the first message should be sent to the IT manager when a service request related to IT is received. In this example, the IT manager may want to manage service requests and be notified when new service requests are generated for IT related issues in the ITSM system. In another example, the user profile can be utilized to send the first message to an IT technician that has a particular level of experience with the type of service request. For example, the first message can be sent to a number of users that have experience working with equipment that is described in the description within the service request.

The action engine 110 can include hardware and/or a combination of hardware and programming, but at least hardware, to add a number of actions to the first message relating to the service request. The number of actions can correspond to a number of actions within the ITSM system. For example, a user from the number of users that receives the first message can confirm receipt of the first message by selecting an action button corresponding to the number of actions. The action button can be embedded within the first message to enable a user to select a corresponding action. When the action button is selected, a corresponding action can be performed within the ITSM system without having to log into the ITSM system to perform the action. For example, a user can select an action button corresponding to a question action. In this example, the user can ask a question relating to the service request. The question can be added (e.g., logged) into the ITSM system corresponding to the service request. In some examples, the action that is performed in response to the selection of the action button can be utilized to generate a second message that is sent to a different number of users based on the corresponding action.

The response engine 112 can include hardware and/or a combination of hardware and programming, but at least hardware, to send a second message to a number of users based on the service request and the number of actions added to the first message. The second message can be based on a combination of the service request and the number of actions added or selected within the first message. For example, the first message can include a number of actions that can be taken by the number of users (e.g., recipients) that received the first message. The actions that are added or selected within the first message can be logged in the ITSM system. Thus, actions that are added or selected within the first message can be performed by the ITSM system and/or logged within the ITSM system. This can enable the number of users to execute actions and/or log actions with the ITSM system without having to log into the ITSM system.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., generate a first message upon receiving a service request, wherein the first message includes a description of the service request, embed a number of action buttons within the first message that correspond to the service request, send the first message to a number of users based on the service request and a profile of the number of users, generate a second message based on a selection of at least one of the number of action buttons, execute an action within an information technology service management system corresponding to the at least one of the number of action buttons, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., editor module 222, message module 224, action module 226, response module 228) can include CRI that when executed by the processing resource 216 can perform functions. The number of modules (e.g., editor module 222, message module 224, action module 226, response module 228) can be sub-modules of other modules. For example, the editor module 222 and the message module 224 can be sub-modules and/or contained within the same computing device. In another example, the number of modules (e.g., editor module 222, message module 224, action module 226, response module 228) can comprise individual modules at separate and distinct locations (e.g., CRM, etc.).

Each of the number of modules (e.g., editor module 222, message module 224, action module 226, response module 228) can include instructions that when executed by the processing resource 216 can function as a corresponding engine as described herein. For example, the editor module 222 can include instructions that when executed by the processing resource 216 can function as the editor engine 106.

Figure 3:
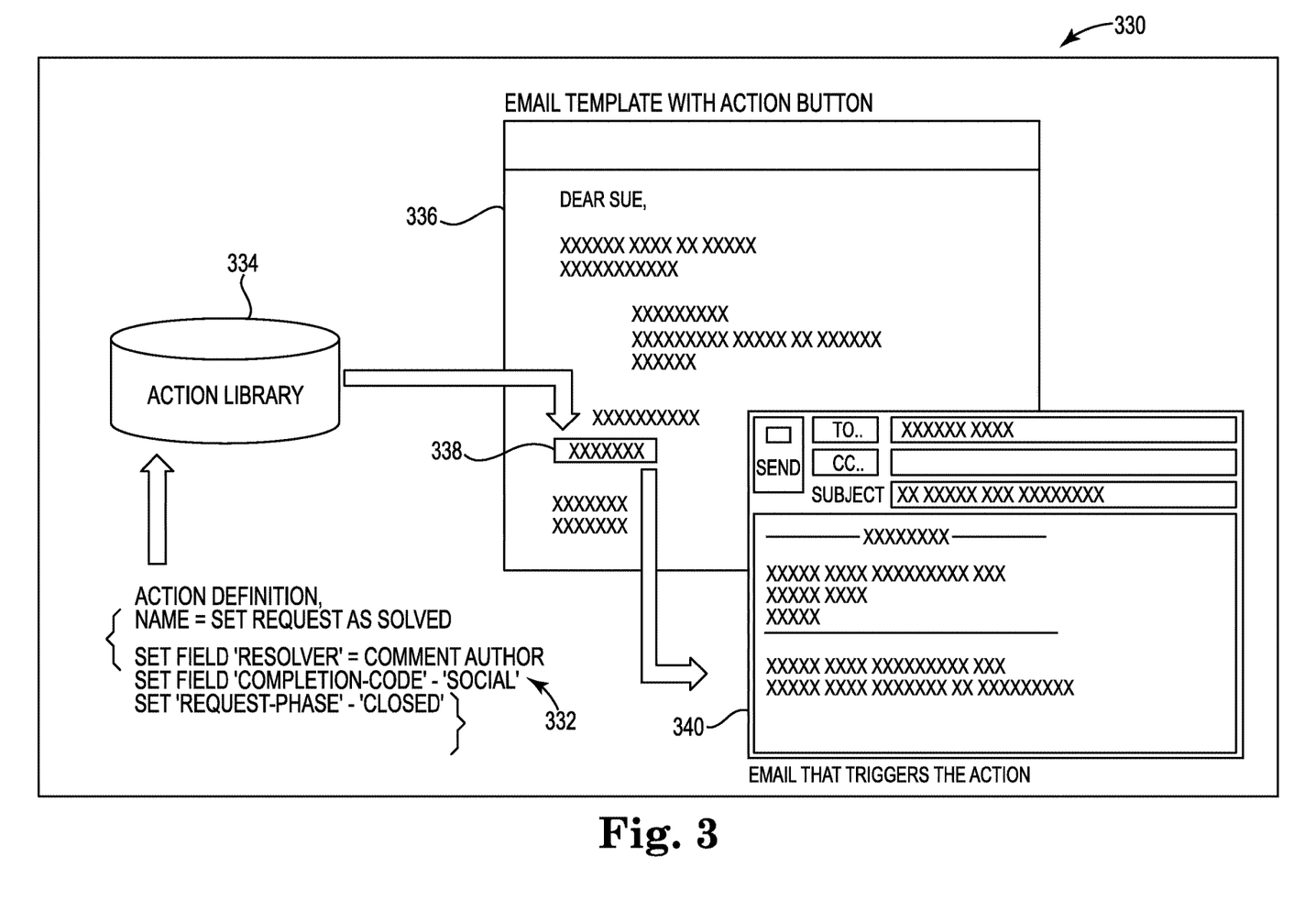
FIG. 3 illustrates a flow chart of an example of a system for message based information technology service management consistent with the present disclosure.

FIG. 3 illustrates a flow chart of an example of a system 330 for message based information technology service management consistent with the present disclosure. The system 330 can include an action library 334. The action library 334 can include a number of action definitions 332. The action definitions 332 can be utilized to define an action button 338 and a corresponding action that is performed by an information technology service management (ITSM) system. The action definitions 332 can correspond to a number of actions performed by or within the ITSM system. For example, the number of actions can include, but are not limited to: adding a comment to the service request, generating an official solution for the service request, adding a resolver (e.g., user associated with solving the service request, etc.) to the service request, adding a completion code (e.g., code corresponding to a method of solving the service request, etc.) to the service request, closing (e.g., ending the communication, record as complete, etc.) the service request, and/or re-opening the service request (e.g., determining that the service request is not complete or the solution did not work, etc.).

In some examples, the number of action definitions 332 can be stored in the action library 334. The action library 334 can include a memory resource that can be utilized to store the number of action definitions 332. The number of action definitions 332 can be generated by a number of users. For example, the number of action definitions can be generated by an ITSM system professional, an IT administrator, and/or a provider of the ITSM system.

In some examples, the action definitions 332 can be configurable and/or customized by the number of users. For example, the number of action definitions 332 can include a, email template 336 that can be customized by the number of users. The email template 336, as described further herein, can be utilized to generate a message based the service request and/or response to the service request. In some examples, the email template 336 can be customized utilizing a number of action buttons 338 that can be utilized a plurality of times by selecting the number of action buttons 338 from the action library 334 and adding the number of the action buttons 338 to the email template 336 to customize the email template for specific service requests. In these examples, the email template 336 can be customized so that only necessary action buttons 338 are embedded within the email template 336 for a particular service request.

In some examples, the action library 334 can be utilized to generate an email template 336 (e.g., message template, text message template, social message template, etc.) with a number of action buttons 338. As described herein, the number of action buttons 338 can be embedded into the email template 336. The number of action buttons 338 can correspond to a number of action definitions 332. That is, the number of action buttons 338 can be utilized to execute a corresponding action definition from the number of action definitions 332. The number of action definitions 332 can include instructions that can be executed by the ITSM system when a corresponding action button 338 is selected within the email template 336. In some examples, an encrypted token can be utilized to notify the ITSM system. For example, upon selecting the action buttons 338, an email with an embedded token can be sent to the ITSM system. In this example, the token can include a description and/or instructions that can be executed by the ITSM system.

In some examples, the action library 334 can embed action buttons 338 that correspond to the number of action definitions 332 based on a number of factors (e.g., type of service request generated within the ITSM system, user profile of a number of users that receive the message, combination of a type of service request and the user profile of the number of users that receive the message, etc.). For example, the action library 334 can embed action buttons 338 that correspond to a type of service requested in the service request. In this example, the type of service requested can include, but is not limited to: a request for a service to be performed, a request for information, a request for a device to be repaired, a request for a device to be installed, a request for a meeting, among other requests for services, products, and/or meetings.

In some examples, the action buttons 338 embedded in the email template 336 can be responses to questions relating to the service request. For example, the email template 336 can be generated based on a question from a previous email relating to the generated service request and/or a question generated within the ITSM system. In either example, the email template 336 can include a number of answers to the question utilizing a number of action buttons 338. For example, the number of answers can include action buttons 338 such as, but not limited to: yes, no, maybe, don't know, among other possible answers to the question.

When an action button 338 is selected by a recipient of the email (e.g., message, etc.), a second email template 340 can be generated. The second email template 340 that is generated can include a description of the response to a question and/or a description of the action button 338 selected by the recipient of the template email 336. In some examples, the number of users that received the email template 336 can also be sent the second email template 340.

The number of users that received the email template 336 can also be sent the second email template 340 to notify the number of users of any status change that relates to the service request. For example, a first user of the number of users may have generated the service request and therefore can have knowledge of the service request. In addition, a second user of the number of users may be a technician or expert that can provide the assistance requested by the service request. In this example, the email template 336 can include a question and a number of action buttons 338 that correspond to a number of possible answers to the question. In this example, the first user can select one of the number of the action buttons 338 and the second email template 340 can be generated and sent to the second user to update the second user with the answer to the question. In this example, all of the interactions between the first user and the second user can be logged and/or recorded in the ITSM system. Logging the interactions with the ITSM system between the first user and the second user without requiring the first or second user to log into the ITSM system can be advantageous for a number of reasons. For example, it can be difficult or cumbersome for the first user to log into the ITSM system each time to respond to questions or other updates relating to the service request when the first user may not be as familiar with the ITSM system. This also saves time for the first user and the second user since neither user has to rely on logging into the ITSM system to confirm that status updates are logged into the ITSM system.

Figure 4:
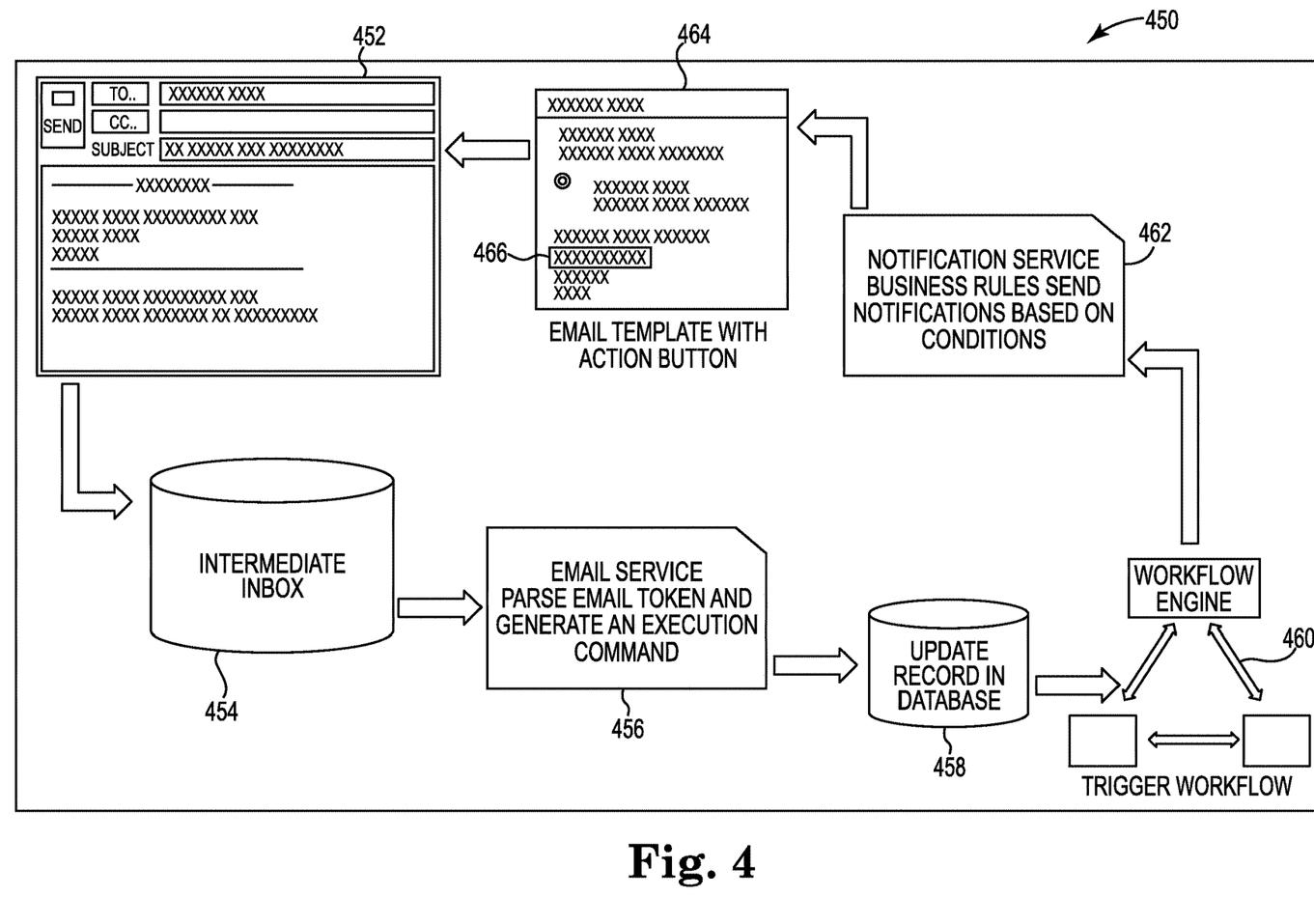
FIG. 4 illustrates a flow chart of an example of a system for message based information technology service management consistent with the present disclosure.

FIG. 4 illustrates a flow chart of an example of a system 450 for message based information technology service management consistent with the present disclosure. The system 450 can utilize a messaging system (e.g., Microsoft Outlook®, SMS messaging system, etc.) to notify and/or update a number of users when a service request is generated or updated using an information technology service management (ITSM) system. In addition, the system 450 can update and/or change a status of the service request in the ITSM system in response to a selection of one or more action buttons that correspond to a particular function as described herein.

The system 450 can include an intermediate inbox 454 that can receive and/or store a number of messages. For example, the intermediate inbox 454 can receive and/or store a number of email messages 452. In some examples, the number of email messages 452 can include an encrypted token that includes instructions and/or descriptions for executing instructions corresponding to a selected action button 466 as described herein.

The system 450 can also include a message parser to parse email tokens and generate an execution command at 456. The message parser can organize the email tokens received at the intermediate inbox 454. When the tokens are organized instructions and/or execution commands corresponding to the tokens can be performed at 456. As described herein, the tokens can correspond to instructions and/or execution commands that can be executed by an ITSM system.

The system 450 can also include updating a record in database 458. The database 458 can be a database corresponding to the ITSM system. The database 458 can include a number of service requests and/or records corresponding to service requests. The database 458 can be updated as described herein. For example, a user can select an action button 466 that corresponds to a particular action as described herein. In this example, a token can be embedded in email 452. The email 452 and/or token embedded in the email 452 can be parsed and/or organized at 456. The action corresponding to the token can be utilized to update and/or log the update in database 458. For example, the action button 466 can correspond to an answer to a question within the email 464. In this example, the token can be utilized to update the database with the answer that was selected via the action button 466.

In some examples, the action button 466 can correspond to an action performed by the ITSM system. In some examples, the action performed can include submitting a question for a number of users. For example, the action button 466 can be selected and a text box can be utilized to provide a word processor for typing or submitting a question that relates to the service request. In some examples, the ITSM system can be triggered to execute a particular function (e.g., workflow) upon receiving the token. In these examples the system 450 can include a workflow 460.

The workflow 460 can be a number of instructions that are executed by the ITSM system to perform a particular function (e.g., function described by action definitions corresponding to the action button 466, etc.). The workflow 460 can be utilized to maintain a status of the service request within the ITSM system utilizing a messaging service. In addition, the workflow 460 can be utilized to perform functions within the ITSM system. Since a token embedded in the email 452 is utilized to execute the workflow 460, the workflow 460 can be executed without a user having to log into the ITSM system.

When the workflow 460 is complete, a notification service 462 can be utilized to update a number of users of a status of the service request based on the workflow 460. For example, the workflow 460 can be an execution that the service request has been complete. In this example, the notification service 462 can utilize an email template 464 to send a notification of the workflow 460 (e.g., that the service request was complete). In some examples, the notification service 462 can utilize the email template to embed a number of action buttons 466 as described herein. For example, the notification service 462 can utilize the number of action buttons 466 to confirm that the service request and/or workflow 460 has been completed. In this example, the notification service 462 can generate the email template 464 with a description of the service request and a notification that the service request has been completed. In addition, the notification service 462 can embed a number of action buttons 466 to enable a recipient of the email template 464 to confirm that the service request has been completed or to notify the ITSM system that the service request has not been completed.

The system 450 can provide a streamline operation for utilizing an ITSM system. The system 450 enables a number of different users to perform functions within the ITSM system and/or update an ITSM system database without having to log into the ITSM system. This can be advantageous for users that are not logging into the ITSM system on a regular basis. In addition, there is not a question of whether a first user that generates the service request or a second user that provides assistance with the service request is responsible for updating the ITSM system. The system 450 can be utilized with a number of different ITSM systems that are utilized to diagnose problems and/or provide information to assist a user with problems.

Figure 5:
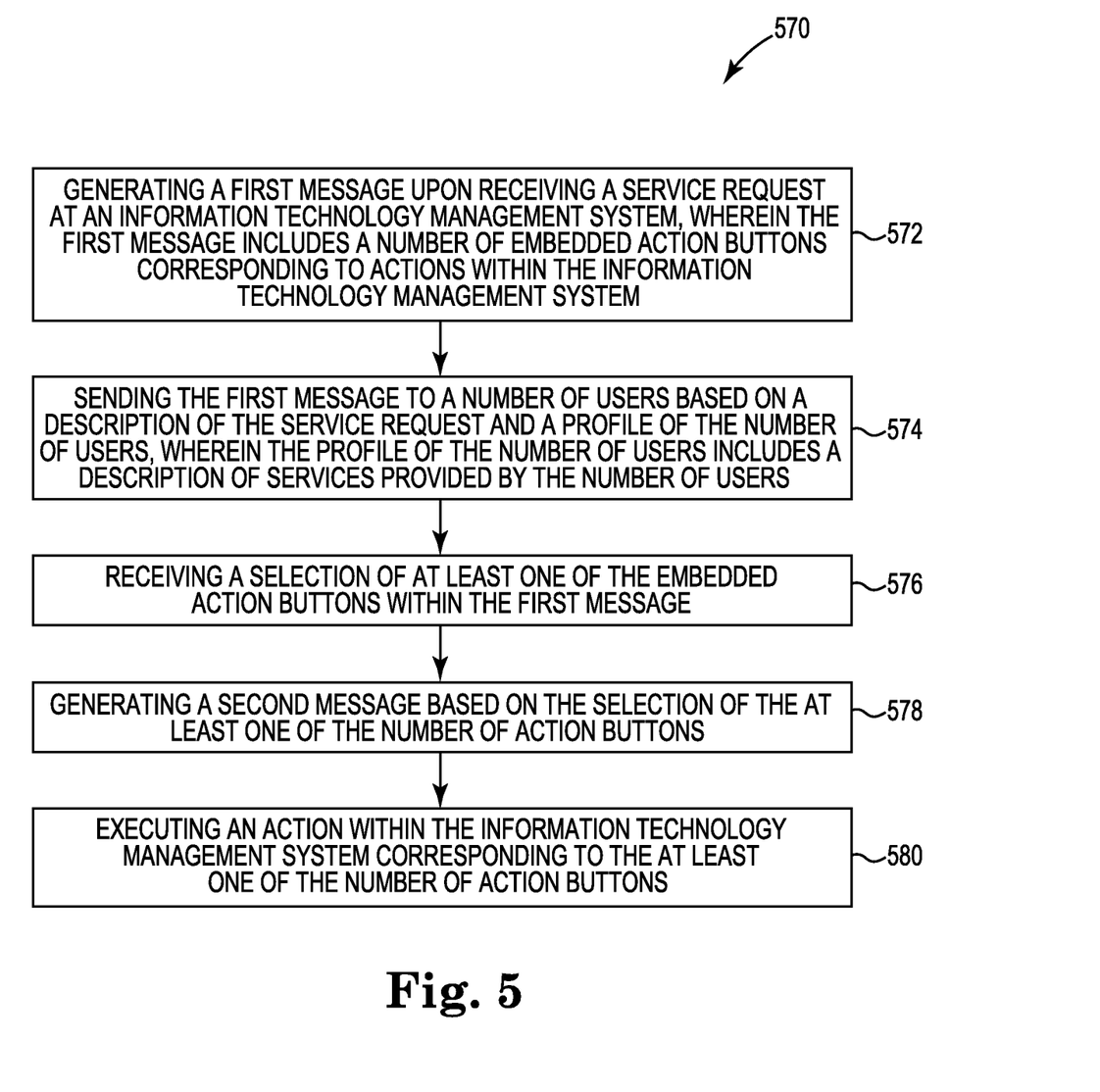
FIG. 5 illustrates a flow chart of an example method for message based information technology service management consistent with the present disclosure.

FIG. 5 illustrates a flow chart of an example method 570 for message based information technology service management consistent with the present disclosure. The method 570 can be executed by a system (e.g., system 100 as referenced in FIG. 1, etc.) and/or computing device (e.g., computing device 214 as referenced in FIG. 2, etc.). The method 570 can be utilized to update and/or perform a number of functions within an information technology service management (ITSM) system. As described herein, the ITSM system can be a system that helps end users with problem solving, troubleshooting, service requests, performance requests, among other services that can be utilized to solve problems with multiple users (e.g., end user, service technicians, IT managers, finance managers, business managers, etc.). For example, the ITSM system can be a system utilized to solve network problems. In this example, the ITSM system can receive service requests when an end user: needs assistance troubleshooting an Internet connect, needs assistance installing a modem, needs hardware to be delivered to an office, among other service requests.

At box 572 the method 570 can include generating a first message upon receiving a service request at an information technology service management system, wherein the first message includes a number of embedded action buttons corresponding to actions within the information technology service management (ITSM) system.

At box 574 the method 570 can include sending the first message to a number of users based on a description of the service request and a profile of the number of users, wherein the profile of the number of users includes a description of services provided by the number of users. As described herein, the first message can include a description of the service request that outlines what the number of users may be interested in based on the profile of the number of users. For example, when the service request is a service request to repair a modem, the description in the first message can include a location of the modem, a model number of the modem, a name of a person who generated the service request, and/or other information that may be helpful in completing the service request.

In some examples, the number of users can be members of the ITSM system. That is, each of the number of users can have an ID and/or user name with a corresponding password associated with the ITSM system. The user profile for the number of users can be associated with their ID and/or user name associated with the ITSM system. The ITSM system can determine a request type for the service request and based on the request type, the first message can be sent to the number of users.

In some examples the number of embedded action buttons can correspond to the request type of the service request. For example, when the request type is a question about a modem, the number of embedded action buttons can be related to common answers to the question about the modem. For example, the question from a technician can be included in the first message and the question can be a question with common answers such as: yes, no, I don't know, among other common answers. In addition, the number of embedded action buttons can include an option to include a text description of the response to the question.

At box 576 the method 570 can include receiving a selection of at least one of the embedded action buttons within the first message. In some examples, receiving the selection can include receiving an encrypted token as described herein at an ITSM system database. The encrypted token can include the selection of the embedded action button along with instructions that can be executed by the ITSM system. For example, the ITSM system database can receive the selection of at least one of the embedded action buttons and update an ITSM system database corresponding to the service request. In this example, a workflow or function can be performed by the ITSM system based on the instructions corresponding to the action button that was selected. In some examples, the workflow or function that is performed by the ITSM system can trigger or execute an additional message that is based on the workflow or function that is performed by the ITSM system.

At box 578 the method 570 can include generating a second message based on the selection of the at least one of the number of action buttons. The second message can be an additional message that is generated based on the workflow or function that is performed by the ITSM system. For example, the workflow can be a determination of a number of users (e.g., technicians, experts, etc.) that may be able to help with the service request. In this example, the second message can be based on the workflow that is performed by the ITSM system, where the workflow that is performed by the ITSM system was based on the number of action buttons that were selected. In some examples, generating a second message can include generating a second message that includes a number of different embedded action buttons based on the on the selection of the at least one of the number of action buttons.

At box 580 the method 570 can include executing an action within the information technology service management system corresponding to the at least one of the number of action buttons. Executing an action within the information technology service management system can include executing a workflow as described herein. For example, the second message can include a token that can include instructions for updating and/or logging the updated information within a database associated with the service request. In some examples, the token can also include instructions that provide for executing a workflow as described herein.

In some examples, the method 580 can include updating the information technology service management system corresponding to the service request upon executing the action within the information technology service management system. For example, when an action is executed by the ITSM system in response to a selection of an action button, the ITSM system can be updated to reflect the action.

The workflow can include a number of functions that are provided by the ITSM system. As described herein, the workflow and/or logging can be performed without having to log into the ITSM system. In some examples, executing the action within the information technology service management system can include executing actions within the information technology service management system through a messaging system separate from the information technology service management system.

As used herein, "logic" is a processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system comprising:
a processor; and
a memory to store instructions that, when executed by the processor, cause the processor to:
receive at an inbox a service request, the inbox receiving service requests of differing types;
select, based on a type of service request and a plurality of user profiles, a number of users from a larger set of users comprising the number of users;
generate a first message addressed to the number of users that includes a description of the service request;
embed a number of action buttons in the first message, wherein the number of action buttons in the first message correspond to a number of actions related to the service request;
send the first message to the number of users;
send a second message to the number of users in response to selection of at least one action button of the number of action buttons;
receive a response from a user of the number of users, the response corresponding to the selection of at least one action button and comprising an encrypted token comprising the selected at least one action button;
parse the response to identify the encrypted token; and
generate an execution command corresponding to the selected at least one action button, the execution command comprising updating and/or logging an update into a database.

2. The system of claim 1, wherein the instructions, when executed by the processor, further cause the processor to:
add the number of action buttons to the first message in response to the service request being received by an information technology service management (ITSM) system.

3. The system of claim 1, wherein each action button of the number of action buttons is selectable for executing a corresponding action from the number of actions and wherein the selection of the at least one action button does not require any of the number of users to log in to the system.

4. The system of claim 3, wherein the number of actions include:
adding a comment to the service request;
generating an official solution for the service request;
adding a resolver to the service request;
adding a completion code to the service request;
closing the service request; or
re-opening the service request.

5. The system of claim 1, wherein the instructions, when executed by the processor, further cause the processor to add the number of action buttons to the service request of an information technology service management (ITSM) system and wherein the processor performs the receive, select, generate, embed, send the first message, and send the second message in the absence of any of the number of users logging in to the system.

6. The system of claim 5, wherein the number of actions are user selectable actions within the first message and wherein the instructions, when executed by the processor, further cause the processor to:
receive a response from a user of the number of users, the response corresponding to the selection of at least one action button and comprising an encrypted token comprising the selected at least one action button;
parse the response to identify the encrypted token; and
generate an execution command corresponding to the selected at least one action button, the execution command comprising updating and/or logging an update into a database.

7. A non-transitory computer readable medium storing instructions executable by a processor to:
receive at an inbox a service request, the inbox receiving service requests of differing types;
select, based on a type of service request and a plurality of user profiles, a number of users from a larger set of users comprising the number of users;
generate a first message addressed to the number of users, wherein the first message includes a description of the service request;
embed a number of action buttons within the first message that correspond to the service request;
send the first message to the number of users;
generate a second message based on a selection of at least one action button of the number of action buttons;
execute an action within an information technology service management system corresponding to the selected at least one action button of the number of action buttons;
receive a response from a user of the number of users, the response corresponding to the selected at least one action button and comprising an encrypted token comprising the selected at least one action button; and
parse the response to identify the encrypted token, wherein the action comprises updating and/or logging an update into a database.

8. The medium of claim 7, wherein the first message and the second message are sent from a system separate from the information technology service management system.

9. The medium of claim 7, wherein the first message includes user profile information and wherein the selection of the at least one action button is not contingent upon any of the number of users to log in to the information technology service management system.

10. The medium of claim 9, wherein the user profile information includes details of a user that initiated the service request and wherein the instructions further cause the processor to:
receive a response from a user of the number of users, the response corresponding to the selected at least one action button and comprising an encrypted token comprising the selected at least one action button; and
parse the response to identify the encrypted token, wherein the action comprises updating and/or logging an update into a database.

11. A method comprising:
receiving at an inbox a service request, the inbox receiving service requests of differing types;
selecting, by a processor based on a description of the service request and a plurality of user profiles, a number of users from a larger set of users comprising the number of users;
generating, by the processor, a first message addressed to the number of users in response to receiving the service request at an information technology service management system, wherein the first message includes a plurality of embedded action buttons corresponding to actions within the information technology service management system;
sending, by the processor, the first message to the number of users, wherein the user profiles of the number of users include a description of services provided by the number of users;
receiving, by the processor, a selection of at least one embedded action button of the plurality of embedded action buttons within the first message;
generating, by the processor, a second message based on the selection of the at least one embedded action button of the plurality of embedded action buttons;
executing, by the processor, an action within the information technology service management system corresponding to the at least one embedded action button of the plurality of embedded action buttons;
receiving, by the processor, a response from a user of the number of users, the response corresponding to the selection of at least one embedded action button and comprising an encrypted token comprising the selected at least one embedded action button;
parsing, by the processor, the response to identify the encrypted token; and
generating, by the processor, an execution command corresponding to the action, the action comprising updating and/or logging an update into a database.

12. The method of claim 11, wherein executing the action within the information technology service management system includes executing actions within the information technology service management system through a messaging system separate from the information technology service management system.

13. The method of claim 11, wherein generating the second message includes generating the second message that includes an embedded action button other than the plurality of embedded action buttons based on the selection of the at least one embedded action button of the plurality of embedded action buttons and wherein the selection of the at least one embedded action button by a user does not require any of the number of users to log in to the system.

14. The method of claim 11, comprising updating the information technology service management system corresponding to the service request upon executing the action within the information technology service management system and wherein the processor performs the receiving of the service request, selecting, generating of the first message, sending of the first message, receiving of the selection, generating the second message, and executing the action in the absence of any of the number of users logging in to the system.

15. The system of claim 1, wherein the instructions, when executed by the processor, further cause the processor to:
  receive a response from a user of the number of users, the response corresponding to the selection of at least one action button and comprising an encrypted token comprising the selected at least one action button;
  parse the response to identify the encrypted token; and
  generate an execution command corresponding to the selected at least one action button, the execution command comprising updating and/or logging an update into a database.

16. The system of claim 1, wherein the selection of the at least one action button does not require any of the number of users to log in to the system.

17. The medium of claim 7, wherein the instructions further cause the processor to:
  receive a response from a user of the number of users, the response corresponding to the selected at least one action button and comprising an encrypted token comprising the selected at least one action button; and
  parse the response to identify the encrypted token, wherein the action comprises updating and/or logging an update into a database.

18. The medium of claim 7, wherein the selection of the at least one action button is not contingent upon any of the number of users to log in to the system.

19. The method of claim 11, further comprising:
  receiving, by the processor, a response from a user of the number of users, the response corresponding to the selection of at least one embedded action button and comprising an encrypted token comprising the selected at least one embedded action button;
  parsing, by the processor, the response to identify the encrypted token; and
  generating, by the processor, an execution command corresponding to the action, the action comprising updating and/or logging an update into a database.

20. The method of claim 11, wherein the selection of the at least one embedded action button by a user does not require any of the number of users to log in to the system.

* * * * *